United States Patent
Gonzaga et al.

(10) Patent No.: US 11,940,318 B2
(45) Date of Patent: Mar. 26, 2024

(54) METHOD FOR DETECTION AND ISOLATION OF FAULTY SENSORS

(71) Applicant: GE Oil & Gas UK, Ltd., Aberdeen (GB)

(72) Inventors: Carlos Alberto Cavichioli Gonzaga, Rio de Janeiro (BR); Luiz Felipe Willcox de Souza, Rio de Janeiro (BR); Luiz Ricardo Douat, Rio de Janeiro (BR); Rafael Horschutz Nemoto, Rio de Janeiro (BR)

(73) Assignee: Baker Hughes Energy Technology UK Limited, Bristol (GB)

( * ) Notice: Subject to any disclaimer, the term of this patent is extended or adjusted under 35 U.S.C. 154(b) by 0 days.

(21) Appl. No.: 15/277,814

(22) Filed: Sep. 27, 2016

(65) Prior Publication Data

US 2018/0087954 A1  Mar. 29, 2018

(51) Int. Cl.

| | | |
|---|---|---|
| *G06F 11/30* | (2006.01) | |
| *G01F 1/34* | (2006.01) | |
| *G01F 1/68* | (2006.01) | |
| *G01F 1/696* | (2006.01) | |
| *G01F 25/00* | (2022.01) | |
| *G01F 25/10* | (2022.01) | |
| *G05B 23/02* | (2006.01) | |

(52) U.S. Cl.
CPC ............... *G01F 25/10* (2022.01); *G01F 1/34* (2013.01); *G01F 1/68* (2013.01); *G01F 1/696* (2013.01); *G01F 25/00* (2013.01); *G05B 23/024* (2013.01)

(58) Field of Classification Search
CPC ..................................................... G01F 25/10
See application file for complete search history.

(56) References Cited

U.S. PATENT DOCUMENTS

| | | |
|---|---|---|
| 3,913,398 A | 10/1975 | Curtis |
| 5,442,562 A | 8/1995 | Hopkins |
| 5,680,409 A * | 10/1997 | Qin .......... G05B 9/02 702/116 |
| 5,983,164 A | 11/1999 | Ocondi |
| 6,352,001 B1 | 3/2002 | Wickert et al. |
| 6,546,811 B2 | 4/2003 | Fincke |
| 6,772,082 B2 | 8/2004 | Van der Geest et al. |
| 6,816,810 B2 | 11/2004 | Henry et al. |

(Continued)

FOREIGN PATENT DOCUMENTS

| | | |
|---|---|---|
| EP | 1 914 638 | 4/2008 |
| WO | 2007116008 A1 | 10/2007 |
| WO | 2009019591 A2 | 2/2009 |

OTHER PUBLICATIONS

Alcala, Carlos F.; Qin, S. Joe; Analysis and generalization of fault diagnosis methods for process monitoring; 2011; Journal of Process Control; p. 322-330.*

(Continued)

*Primary Examiner* — Phuong Huynh
(74) *Attorney, Agent, or Firm* — Hogan Lovells US LLP

(57) ABSTRACT

Technical effects of the invention include use of a data-driven multivariate statistical method for the detection and isolation of sensor faults applied in a virtual flow metering context. In one implementation, the data-driven multivariate statistical method employs principal components analysis, weighted squared prediction error, and partial decomposition contribution plots.

19 Claims, 8 Drawing Sheets

(56) References Cited

U.S. PATENT DOCUMENTS

| | | | |
|---|---|---|---|
| 6,941,254 B2 | 9/2005 | Duret et al. | |
| 7,054,764 B2 | 5/2006 | Williams et al. | |
| 7,447,609 B2* | 11/2008 | Guralnik | G05B 23/0254 |
| | | | 702/179 |
| 7,474,969 B2 | 1/2009 | Poulisse | |
| 7,654,151 B2 | 2/2010 | Agar et al. | |
| 7,674,624 B2 | 3/2010 | Stephenson et al. | |
| 7,725,301 B2 | 5/2010 | Shah et al. | |
| 8,073,665 B2 | 12/2011 | Watters et al. | |
| 8,121,817 B2 | 2/2012 | Landells et al. | |
| 8,136,414 B2 | 3/2012 | Steven | |
| 8,170,801 B2 | 5/2012 | Foot et al. | |
| 8,452,551 B2 | 5/2013 | Gysling | |
| 8,793,004 B2* | 7/2014 | Grichnik | G05B 23/0235 |
| | | | 700/19 |
| 8,825,567 B2 | 9/2014 | Jiang et al. | |
| 2003/0065462 A1 | 4/2003 | Potyrailo | |
| 2005/0149264 A1 | 7/2005 | Tarvin et al. | |
| 2006/0162466 A1 | 7/2006 | Wargo et al. | |
| 2007/0068672 A1 | 3/2007 | Jalali et al. | |
| 2007/0124113 A1* | 5/2007 | Foslien | G05B 23/024 |
| | | | 702/185 |
| 2007/0192046 A1 | 8/2007 | Hairston | |
| 2007/0213963 A1 | 9/2007 | Jalali et al. | |
| 2008/0082181 A1 | 4/2008 | Miller | |
| 2008/0125916 A1 | 5/2008 | Ellender et al. | |
| 2008/0276128 A1* | 11/2008 | Lin | G05B 19/0428 |
| | | | 714/45 |
| 2008/0300802 A1 | 12/2008 | Lakhani et al. | |
| 2009/0084545 A1 | 4/2009 | Banerjee et al. | |
| 2009/0112491 A1 | 4/2009 | Nakada et al. | |
| 2009/0149969 A1 | 6/2009 | Slupphaug et al. | |
| 2009/0293634 A1 | 12/2009 | Ong | |
| 2009/0308601 A1* | 12/2009 | Poe, Jr. | E21B 47/10 |
| | | | 166/250.01 |
| 2010/0094569 A1 | 4/2010 | Gysling | |
| 2010/0324873 A1 | 12/2010 | Cameron | |
| 2011/0010318 A1* | 1/2011 | Roverso | F01N 9/005 |
| | | | 706/12 |
| 2011/0040485 A1 | 2/2011 | Ong | |
| 2011/0226469 A1* | 9/2011 | Lovell | E21B 47/1005 |
| | | | 166/250.01 |
| 2011/0301851 A1* | 12/2011 | Briers | E21B 43/00 |
| | | | 702/12 |
| 2011/0307104 A1 | 12/2011 | Smirnov | |
| 2012/0209542 A1 | 8/2012 | Gysling | |
| 2013/0008235 A1 | 1/2013 | Nilsson | |
| 2016/0265341 A1* | 9/2016 | Subervie | E21B 49/087 |
| 2016/0342903 A1* | 11/2016 | Shumpert | G06N 99/005 |
| 2016/0356125 A1* | 12/2016 | Bello | G06Q 10/04 |
| 2017/0211954 A1* | 7/2017 | Dykstra | E21B 21/01 |

OTHER PUBLICATIONS

Yinghua, Yang, et al.; "A new fault detection and diagnosis method based on principal component analysis in multivariate continuous processes", Intelligent Control and Automation, 2002. Proceedings of the 4th World Congress, pp. 3156-3160, vol. 4.

Office Action dated Nov. 23, 2021 in corresponding EP Application No. 17 772 237.8-1001.

International Search Report and Written Opinion dated Dec. 12, 2017 in corresponding PCT Application No. PCT/US2017/051433.

Drazen Sliskovic et al., "Multivariate statistical process monitoring," Technical gazette, vol. 19, Mar. 1, 2012, pp. 33-41, http://hrcak.srce.hr/file/117623.

K. Mokhtari et al., "Performance evaluation of multiphase flow models applied to virtual flow metering," Proceedings of the 11th International Conference on Engineering Sciences (AFM 2016), Advances in Fluid Mechanics XI, vol. 1, Sep. 5, 2016, pp. 99-111.

Li Song et al., "Uncertainty analysis of a virtual water flow measurement in building energy consumption monitoring," HVAC&R Research, Oct. 1, 2012, p. 997, http://www.tandfonline.com/doi/pdf/10.1080/1078669.2012.658137?needAccess=true.

Stephane Leger et al., "Fault Detection and Isolation in Dynamic Systems Using Principal Component Analysis—Application to an Heating System Benchmark," Proceedings of the 17th World Congress The International Federation of Automatic Control; Seoul, Korea, Jul. 6-11, 2008, vol. 36, No. 5, pp. 513-518.

International Preliminary Report on Patentability dated Apr. 2, 2019 in corresponding PCT Application No. PCT/US2017/051433.

* cited by examiner

METHOD FOR DETECTION AND ISOLATION OF FAULTY SENSORS

BACKGROUND

The subject matter disclosed herein relates to the use of virtual flow metering in resource production contexts, such as oil and gas production.

In various contexts where a fluid medium, either liquid or gas, is flowed between various locations, the control of the flow may be controlled at least in part using measured flow aspects. Various types of flow meters may be provided to provide data on the flow of the fluid at a given time and at a given location. By way of example, in a hydrocarbon production context, flow meters may measure flow at one or more locations in the production path to provide data on the flow of the production fluid through various parts of the production system.

By way of example, two types of flow meter technologies are physical flow meters and virtual flow meters. In the context of physical multiphase flow meters, these flow meters typically estimate the flow rate of each phase in question by utilizing a combination of techniques, which may each in turn utilize various electronic sensing devices, such as microwave sensors, electrical impedance sensors, doppler ultrasound sensors, gamma ray sensors, and so forth.

There may be various drawbacks associated with the use of physical flow meters, including cost (since expensive sensors are typically employed), reliability (since complex sensors are typically more susceptible to failure), communication and power supply issues (e.g., high power consumption to keep sensors working demands specific umbilical pipes), and precision and accuracy (generally, physical flow meters present measurement errors due to the complexity of a multiphase flow).

Virtual flow meters may also utilize various sensor systems and algorithms for estimating flow rates. However, virtual flow meters typically make use of less complex types of sensors (e.g. temperature and pressure sensors) from whose measurements flow data is estimated. Both the physical and virtual flow metering approaches typically utilize complex data-fusion algorithms for estimating flow rates based on the measurements provided by the sensing units.

The maintenance of virtual flow meter accuracy over the life of a production site (e.g., an oil or gas field) is one challenge to the successful deployment of virtual flow meters at certain sites, such as subsea locations. The use of virtual flow meters may be subject to errors attributable primarily to two sources: models and sensor measurements. Model errors may be related either to mathematical modeling not adequately addressing the underlying physics or wrong (or varying) parameter assumptions (pipe roughness variation due to the incrustation of minerals, diameter variation due to the formation of wax, and so forth). Sensor measurements can be subjected to bias, drifts, precision degradation, or even total sensor failure. Such sensor failures or other sensor faults can compromise the quality in the results of a virtual flow metering approach.

BRIEF DESCRIPTION

In one embodiment, a virtual flow meter is provided for assessing fluid flows of a fluid-gathering network. In accordance with this approach, a processor-based controller is provided that is configured to: acquire training measurements from a plurality of sensors over time; perform a principal components analysis of the training data to generate a principal components model defining a principal components component and a residual subspace; acquire current measurements from the plurality of sensors; determine the number of operating points based on the current measurements; project the current measurements of each operating point into the residual subspace to detect one or more outliers, if present; if one or more outliers are detected, apply partial decomposition to generate one or more contribution plots; and based on the contribution plots, provide an indication as to which sensor or sensors are at fault.

In accordance with a further embodiment, a processor-based method is provided for identifying faulty sensors in a fluid production network. In accordance with this method, training measurements are acquired from a plurality of sensors over time. A principal components analysis of the training data is performed to generate a principal components model defining a principal components component and a residual subspace. Current measurements are acquired from the plurality of sensors. The number of operating points are determined based on the current measurements. The current measurements of each operating point are projected into the residual subspace to detect one or more outliers, if present. If one or more outliers are detected, partial decomposition is applied to generate one or more contribution plots. Based on the contribution plots, an indication is provided as to which sensor or sensors are at fault.

In an additional embodiment, one or more computer-readable media comprising executable routines are provided. The routines, when executed by a processor cause acts to be performed comprising: acquiring training measurements from a plurality of sensors over time; performing a principal components analysis of the training data to generate a principal components model defining a principal components component and a residual subspace; acquiring current measurements from the plurality of sensors; determining the number of operating points based on the current measurements; projecting the current measurements of each operating point into the residual subspace to detect one or more outliers, if present; if one or more outliers are detected, applying partial decomposition to generate one or more contribution plots; and based on the contribution plots, providing an indication as to which sensor or sensors are at fault.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present approach applies a data-driven multivariate statistical method based on Principal Components Analysis, Weighted Squared Prediction Error, and Partial Decomposition Contribution Plots to the detection and isolation of subsea sensor faults in a virtual flow metering context.

As discussed herein, benefits of the proposed method include, but are not limited to: (1) detection that a fault has occurred in one or more pressure and/or temperature sensors; (2) isolation of the fault(s) (i.e., identifying which sensor(s) are faulty; and (3) enhancing robustness of a virtual flow metering application and the calibration of such an application by increasing reliability of sensor measurements.

Figure 1:
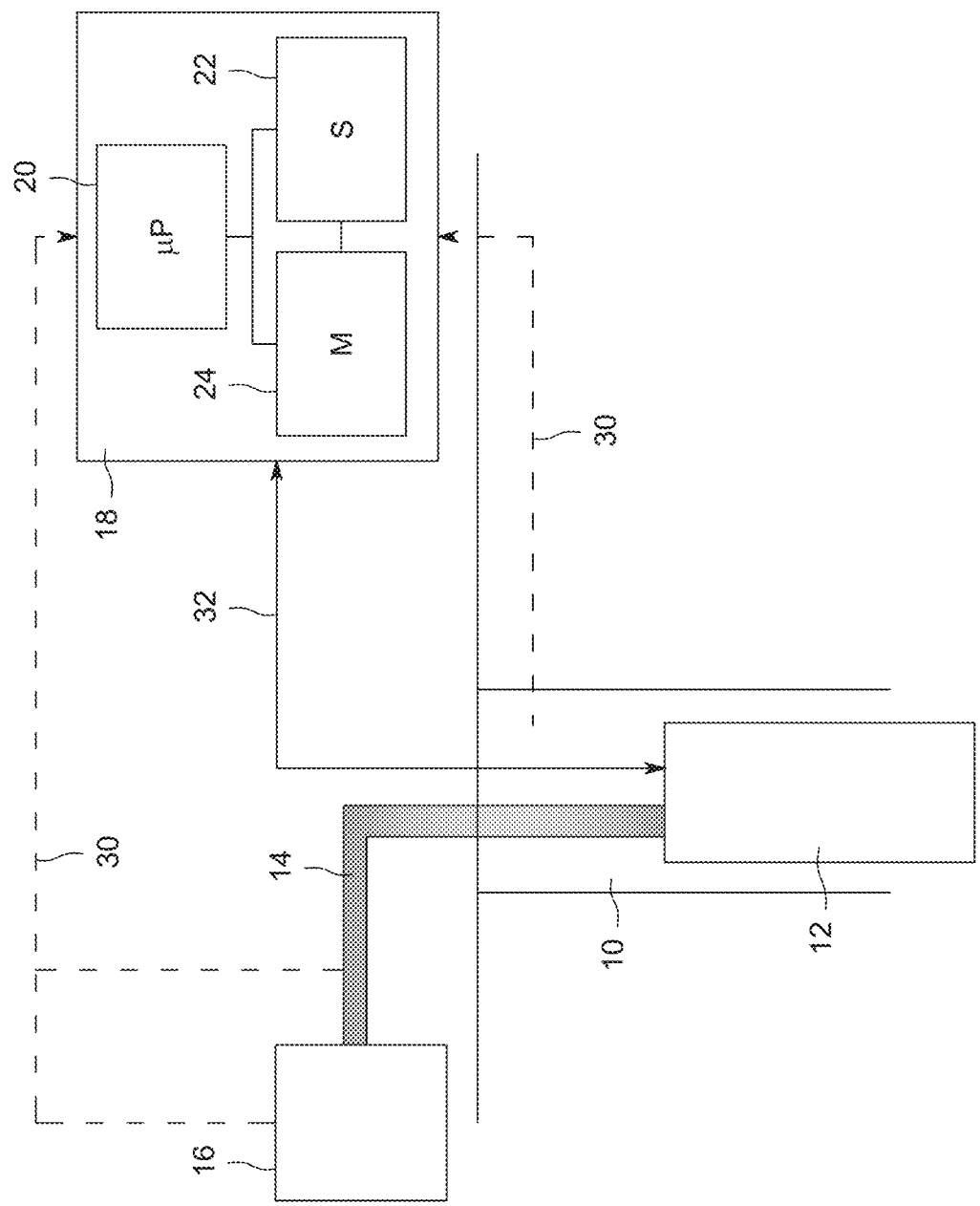
FIG. 1 depicts a generalized view of a resource production system suitable for use with a virtual flow metering algorithm, in accordance with aspects of the present disclosure.

With the preceding in mind, a high-level, simplified overview of aspects of a production site and control system employing a virtual flow meter are shown in FIG. 1. In this example, a hydrocarbon production site is depicted. Such a site may be subsea or on-shore. In this example, the site includes a downhole environment (e.g., a wellbore 10) in which a downhole tool 12 is positioned. The downhole tool 12 may include one or more pumps, such as electric submersible pumps (ESPs), that facilitate the movement of a production fluid 14 from the downhole environment to a downstream facility 16, such as storage tanks, separators or separation tanks, and so forth.

In the depicted example, the flow of the production fluid 14 may be controlled at least in part by the operation of the downhole tool 12 or, in alternative approaches by changing the opening of choke valves located in production manifolds, Xmas trees, a topside separator, or other flow diversion or restriction locations in the production flow path. With reference to the depicted example, the operation of the downhole tool 12 is, in this example, controlled at least in part by the operation of a controller 18 configured to implement a virtual flow meter as discussed herein. Though the downhole tool 12 in this example is depicted as being in communication with, and operated based on, the controller 18, it should be appreciated that other pumps or flow control devices may be operated based on the controller 18 in addition to or instead of the downhole tool 12. For example, the controller 18 (or other similarly configured controllers 18 at the site) may control other devices or components that cause the flow of the production fluid 14 between locations at the monitored site.

In the depicted embodiment, the controller 18 is a processor-based controller, having at least one microprocessor 20 to execute an algorithm corresponding to a virtual flow meter. For example, the microprocessor 20 may execute stored routines corresponding to the virtual flow meter algorithms (including routines for identifying faulty sensor as discussed herein) stored in a storage 22 and/or memory 24 of the controller 18. The processor 20 may also access sensor data 30 acquired from one or more sensor (e.g., pressure and/or temperature sensors, and/or flow rates of gas, oil, and/or water measured using multiphase flow meters) located at locations (as shown by dashed lines 30) in the fluid flow path. In the same manner, in certain embodiments sensor and/or operational data may be provided to the controller 18 by a tool 12 responsible for the flow of the production fluid 14. Though the controller 18 is depicted in FIG. 1 as a stand-alone or specially programmed device, it should be understood that the functionality of the controller 18 (e.g., executing routines for implementing a virtual flow meter algorithm and for identifying faulty sensors as discussed herein) may be one set of routines executed on a computer or other processor-based system that, in addition, executes other routines and performs other functions. Further, though a processor-based implementation is shown in FIG. 1, in alternative implementations the controller 18 may be implemented as one or more application-specific integrated circuits specifically programmed to perform the routines associated with the virtual flow meter described herein when provided with the proper inputs.

In the depicted example, the controller 18 receives sensor input data, such as from pressure, temperature, and/or mass flow sensors in the fluid flow path, and acts as virtual flow meter, generating an estimate of the flow of the production fluid 14 at one or more locations in the monitored site. The flow estimates in the depicted example may be used to generate a control signal 32 used to control the operation of one or more flow controlling devices, such as pumps, valves, and so forth. In the depicted example, the control signal 32 is used to control operation of the downhole tool 12, such as an electrical submersible pump or other pumping device. In this manner, based on the flow estimated by the virtual flow meter implemented on controller 18, the operation of one or more flow controlling devices may be controlled so as to stay within desired production parameters.

As discussed herein, in accordance with the present approach a data-driven multivariate statistical method is employed for the detection and isolation of sensor faults in a virtual flow metering context. In one implementation, the data-driven multivariate statistical method is based on Operating Points Determination, Principal Components Analysis (PCA), Weighted Squared Prediction Error, and Partial Decomposition Contribution Plots.

Steady State Conditions Detection

In addition to requiring the intervention of the operator, it may be of interest to have an automatic averaging of the process variables in order to identify the steady-state, with an aim of defining the number of operating points. To this end, the i-th node pressure is considered herein, with the same reasoning being applied for the other process variables.

In one embodiment, the first step is to filter the data to minimize the effects of noise for the purpose of defining the number of operating points. By way of example, in one implementation, a widespread simple receding horizon filtering (S.M.A.) is applied with a time window size set to N=5 samples. This filter, or comparable filters, may be suitable due to its small number of tuning parameters (for the simple case, no parameter is required) and its simplicity for implementation. In one implementation, the recursive form of the filter may be employed, as shown below:

$$\bar{x}_k = \bar{x}_{k-1} - \frac{x_{k-N}}{N} + \frac{x_k}{N}, \text{ with } \bar{x}_0 = \frac{1}{N}\sum_{i=0}^{N-1} x_{k+i}, \quad (1)$$

where x refers to the considered process variable (temperature, pressure or well mass flow rate) or input (choke opening). Once the averaging is performed, the number of operating points is defined by analyzing the variation of the filtered choke opening along the time history. To this end, the following set concatenates the discrete-time instants such that the choke opening variation is below a certain limit:

$$S_{\bar{\Phi}} = \{k \in \mathbb{N} \text{ s.t. } |\bar{\Phi}_k - \bar{\Phi}_{k-1}| \leq \varepsilon\}, \quad (2)$$

where, in one implementation, ε>0 was defined to 0.025 since the variations on the choke opening usually are given by 5%. In addition, one may conclude that the set $S_{\bar{\Phi}}$ will contain time instants—associated with constant values of choke opening—that are not strictly ordered. The gap between two subsequent elements of this set indicates the change of operating point. It is possible to split the set such that the number of operating points is obtained, as follows:

$$\delta_{\bar{\Phi}} = \bigcup_{j=1}^{O_p} \delta_{\bar{\Phi}}^j. \quad (3)$$

In order to have the appropriate values for the operating points, a similar reasoning may be applied for the well mass flow rate, the node pressures, and/or the temperatures. This may be justified by the fact that the time instants associated with the steady state values of such process variables are at most the same ones of the choke opening which, as noted above, is an approximation that assumes nothing else is changing. More precisely, one searches the sets $S_{\Phi}^j$ in order to have these time instants:

$$\delta_{\overline{p^n}}^j = \left\{k \in \delta_{\Phi}^j \text{ s.t. } \frac{|\overline{p_k^{n,j}} - \overline{p_{k-1}^{n,j}}|}{\overline{p_{k-1}^{n,j}}} \leq \varepsilon_1\right\}, \forall n \in \{1, \ldots, N_{nodes}\}, \quad (4)$$

$$\delta_{\overline{T^n}}^j = \left\{k \in \delta_{\Phi}^j \text{ s.t. } \frac{|\overline{T_k^{n,j}} - \overline{T_{k-1}^{n,j}}|}{\overline{T_{k-1}^{n,j}}} \leq \varepsilon_2\right\}, \forall n \in \{1, \ldots, N_{nodes}\}, \quad (5)$$

$$\delta_{\overline{\dot{m}^w}}^j = \left\{k \in \delta_{\Phi}^j \text{ s.t. } \frac{|\overline{\dot{m}_k^{w,j}} - \overline{\dot{m}_{k-1}^{w,j}}|}{\overline{\dot{m}_{k-1}^{w,j}}} \leq \varepsilon_3\right\}, \forall w \in \{1, \ldots, N_{wells}\}. \quad (6)$$

By applying the proposed filtering combined with this data cross-checking, it is possible to obtain the mass flow rates, node temperatures, and node pressures as averaged measurements associated with the time instants of the sets defined above. Thus, the operating point's data are available to be passed as input for a suitable diagnostic and/or monitoring toolset. This approach is reasonable when the system operates under normal conditions. Also, it may be noted that, in certain implementations the filtering technique mentioned above may be omitted and, instead, other suitable techniques employed. Further, the proposed technique of concatenation may be useful for event-driven alarms by identifying eventual transitions on the process variables such as node temperatures, pressures and well flow rates, usually exhibiting slow time response, as well as for abnormal sensor operations, in general associated with a short time scale.

Principle Components Analysis Principles—

With respect to principle components analysis, a brief overview is provided. Given a measurement vector at a time instant of a system in steady-state, different samples of such a vector (related to a sequence of measurements over time) may be concatenated to form a data matrix. The principle components analysis allows determining an auxiliary vector of new variables based on an optimal linear transformation (according to a variance criterion) of the original data vector.

This auxiliary vector is called the principal component vector and the transformation matrix has each column related to the eigenvectors of the covariance matrix of the matrix formed with the sequence of measurements where the eigenvalues are in monotonically decreasing order. Based on this order of the eigenvalues, the measurements can be split into two components: one depending on the principal components (highest eigenvectors) and another related to the residuals (residual subspace).

Fault Detection—

With the preceding in mind, the detection of faulty temperature and/or pressure sensors (i.e., fault detection) is carried on in the residual subspace by means of the weighted squared prediction error (SWE) metric. The residual vector, related to the noise affecting the measurements, is defined by the projection of the measurements in the residual subspace. And the SWE(i)(k) index is computed for each time instant k by taking into account this residual subspace projection and the smallest eigenvalues of the initial data covariance matrix.

In one implementation, an SWE index is computed over historical measured data. This allows one to establish (assuming a quasi steady-state operation regime) a mean and standard variation for this variable during the training phase of the sensor fault detection and isolation algorithm.

During operation, statistical tests (e.g., Chi-square) can be applied in order to determine if the newly computed SWE (i)(k) at each instant k maps onto the normal operation condition as assessed with respect to the SWE index. Once statistical deviations appear with respect to the index, a sensor fault is presumed since the projection of unusually high magnitudes onto this subspace (i.e., the residual subspace) may be indicative of outliers.

Fault Isolation—

Once detected, faults can be isolated by means of contribution plots. Contribution plots, relying on the investigation of the underlying statistical projection methods, allow determination of the contribution of each variable to the out-of-control statistic (i.e., the deviation from normality).

Figure 2:
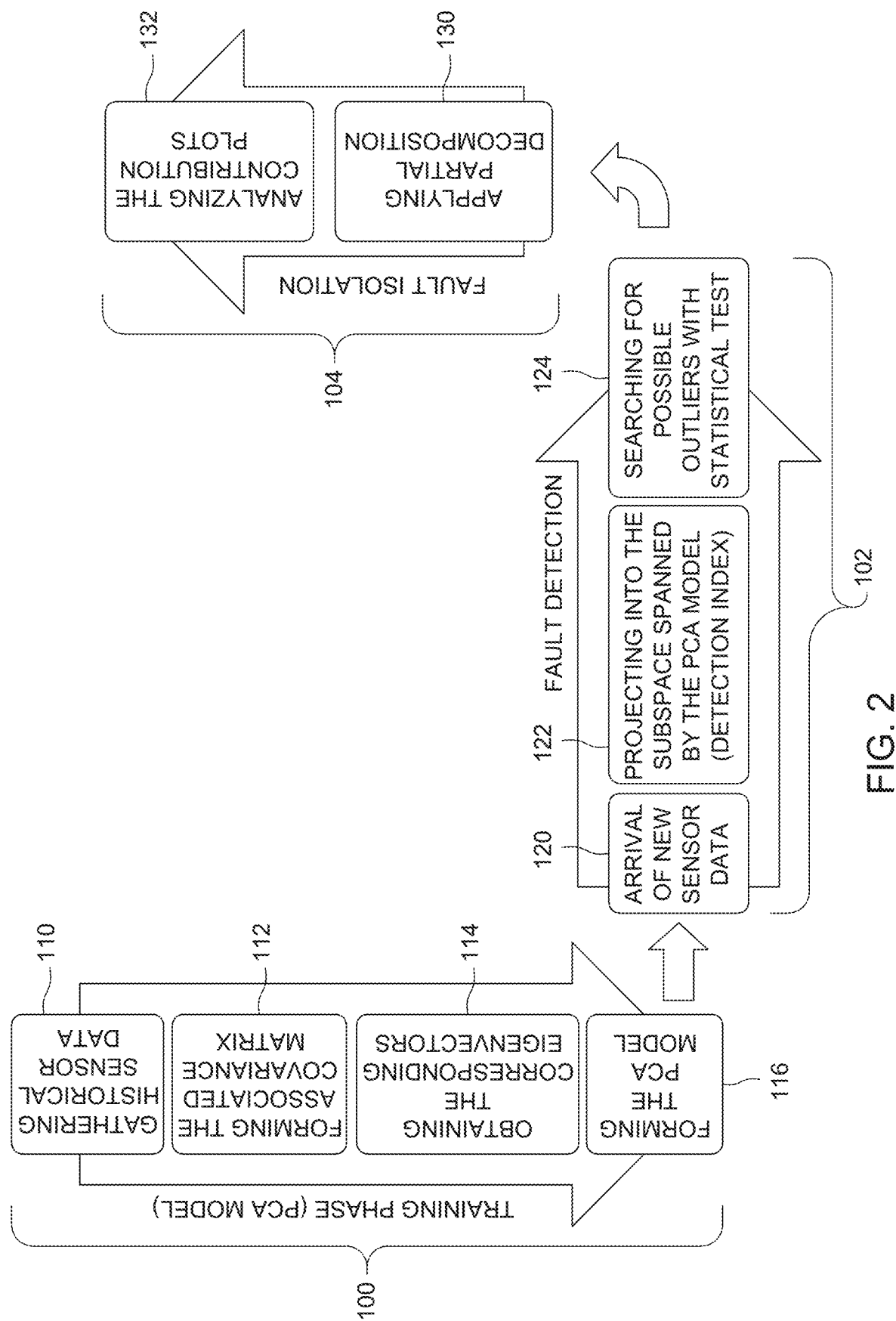
FIG. 2 depicts a process flow of steps in training phase, fault detection, and fault isolation stages of a present implementation, in accordance with aspects of the present disclosure.

A brief overview of one implementation of the present approach, as outlined in the preceding sections, is given in FIG. 2. As shown in FIG. 2, the described process can be broken down into a training phase 100 (based on the use of a PCA model), a fault detection phase 102, and a fault isolation phase 104.

With respect to the training phase 100, an initial step 110 is to gather historical sensor data, which is then used to form the associated covariance matrix (step 112). The corresponding eigenvectors are obtained (step 114) and the PCA model is formed (step 116).

At the fault detection phase 102, new sensor data is acquired (step 120) and projected into the subspace spanned by the PCA model (i.e., the detection index) previously generated. Based on this projection step, potential outliers are identified (step 124) using a suitable statistical test.

When fault conditions are detected, they are isolated in the fault isolation phase 104. In this phase, a partial decomposition is applied (step 130) and the resulting contribution plots analyzed (step 132) to identify which sensor(s) are faulty based on the newly arrived sensor data.

Simulation Results—

Figure 3:
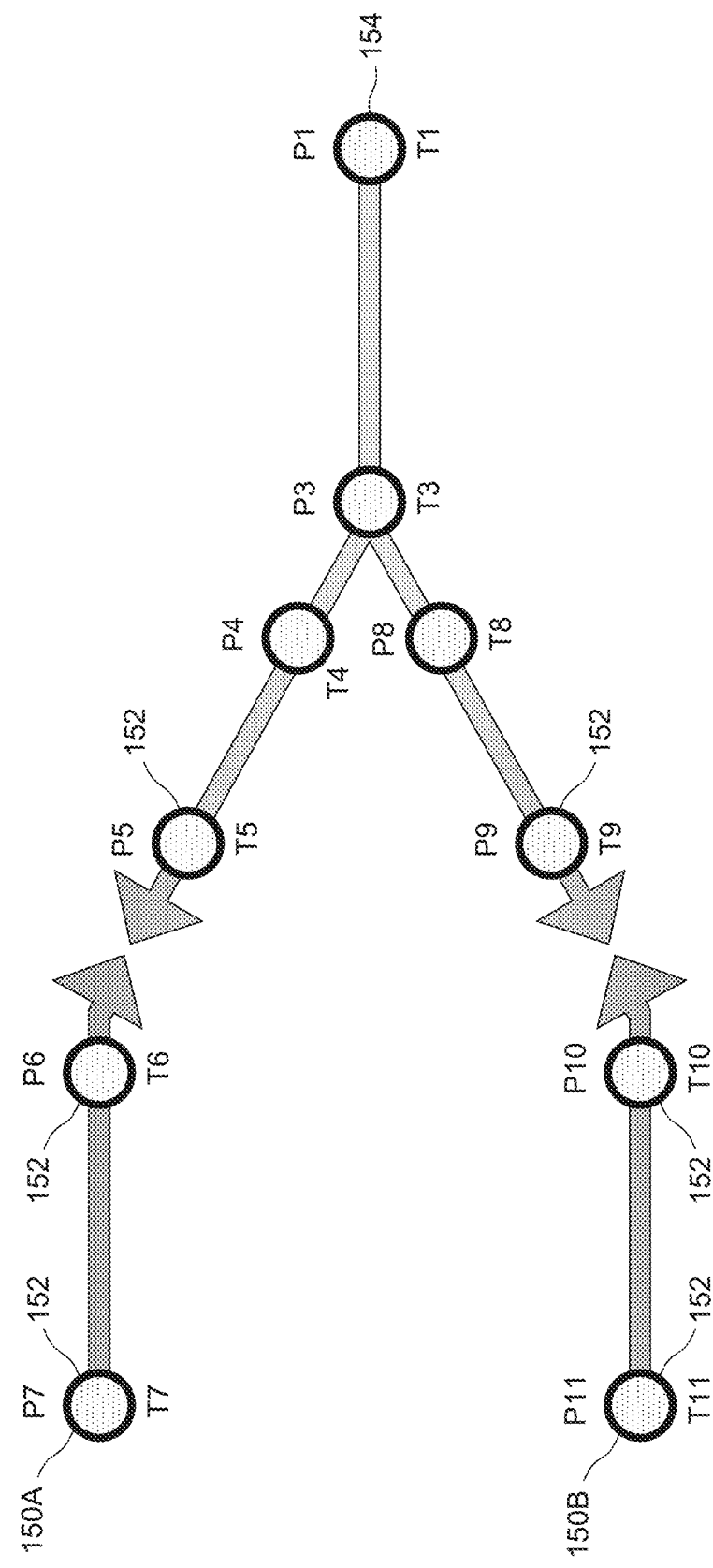
FIG. 3 depicts a simulated gas field topology, in accordance with aspects of the present disclosure.

With the preceding in mind, various simulation examples are provided for further context and guidance. In order to provide the testing data for the sensor fault detection and isolation algorithms, a subsea gas field was simulated in LedaFlow, in a quasi steady-state condition. The topology of the simulated gas field is illustrated in FIG. 3 for two wells 150A, 150B, pressure and temperature sensors 152 and a top side node 154.

Figure 4:
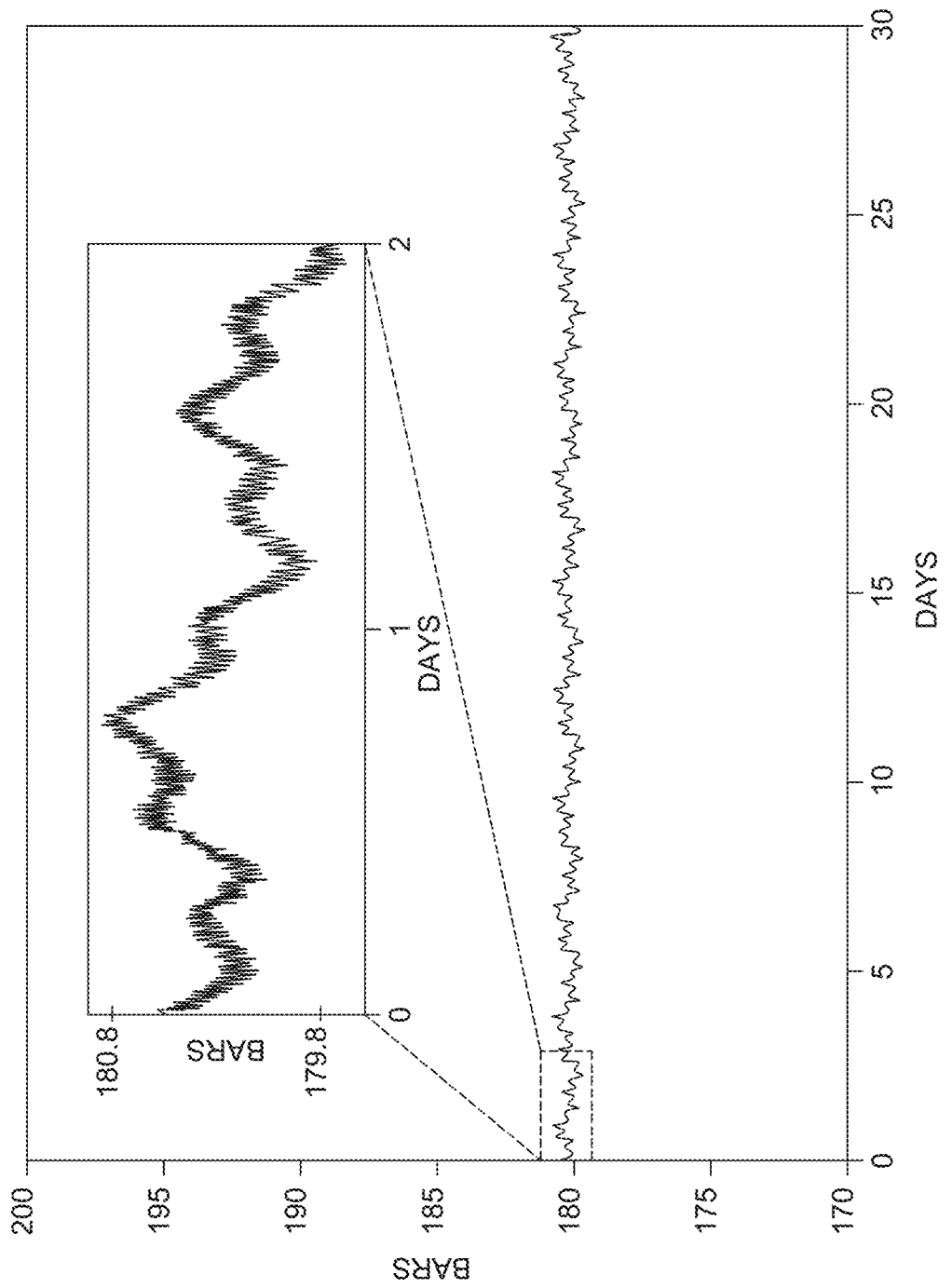
FIG. 4 depicts a simulated pressure signal at a top side node, in accordance with aspects of the present disclosure.

Noisy signals were generated for a timespan of 30 days with a sampling period of 2 minutes. These signals were down propagated through the pipelines from the top side (node 154) to the wells 150 by means of the nonlinear flow equations computed in LedaFlow, providing pressure and temperature readings at each individual sensor 152. Per the simulation, the pressure signal at the top side node 154 is shown in FIG. 4.

The subsea gas field simulation results were used for the investigation, in Matlab, of the sensor fault detection and isolation technique discussed herein. Since the contribution of pressure measurements to flow estimation is significantly larger than that of temperature ones, only pressure sensor faults were considered in the simulations. However, as may be appreciated, the approach may be similarly applied to temperature sensors fault detection and isolation as well. For the purposes of the present analysis, only the pressure sensor measurements were employed in pressure sensor fault detection and isolation.

Thus, the dataset under consideration consists of 10 pressure sensors gathering data during 30 days at a sample time of 2 minutes. The two first days of measurements (i.e., training data) were used to build a model of normal operation of the process. That is, during this period of time it is assumed that no fault occurred.

Registered data from the third day on was considered here to be test data. A bias of 5% was artificially introduced to the test data after a time elapse of 3 hours, both on one sensor at a time and on simultaneous sensors, generating some scenarios for the fault detection and isolation technique analysis.

The PCA model was constructed based on the residual eigenvalues/eigenvectors from the covariance matrix obtained from the training data matrix. The eigenvalues obtained from the training data covariance matrix are shown in FIG. 5.

Figure 5:
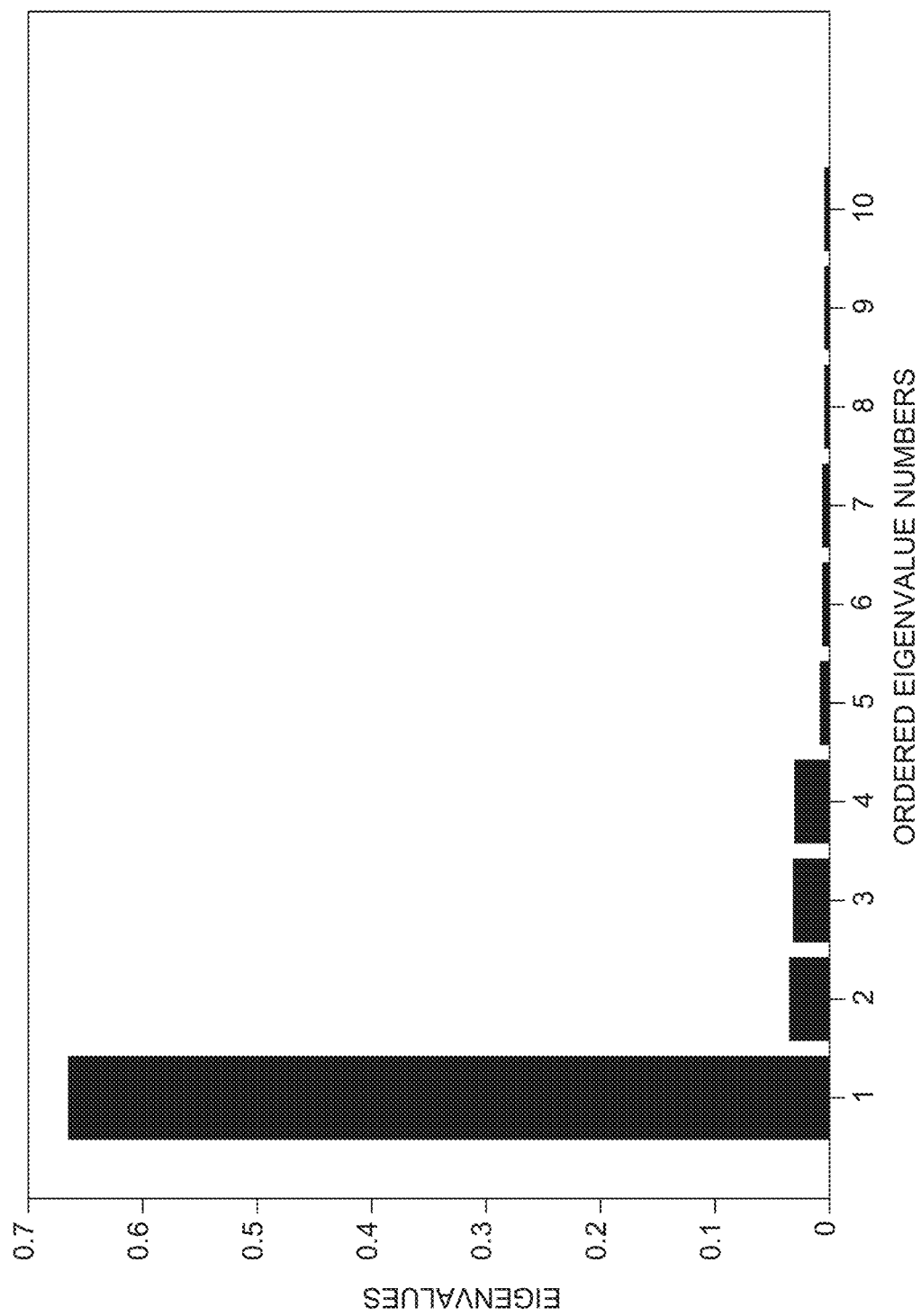
FIG. 5 depicts eigenvalues of a training data covariance matrix, in accordance with aspects of the present disclosure.

Based on values shown in FIG. 5, the first eigenvalue/eigenvector is the one which better explains the correlation among the variables (i.e., eigenvalue 1 in the depicted ordered set). The residual subspace was chosen to be formed by the remaining 9 eigenvalues/eigenvectors, which were used to build the PCA model.

Figure 6:
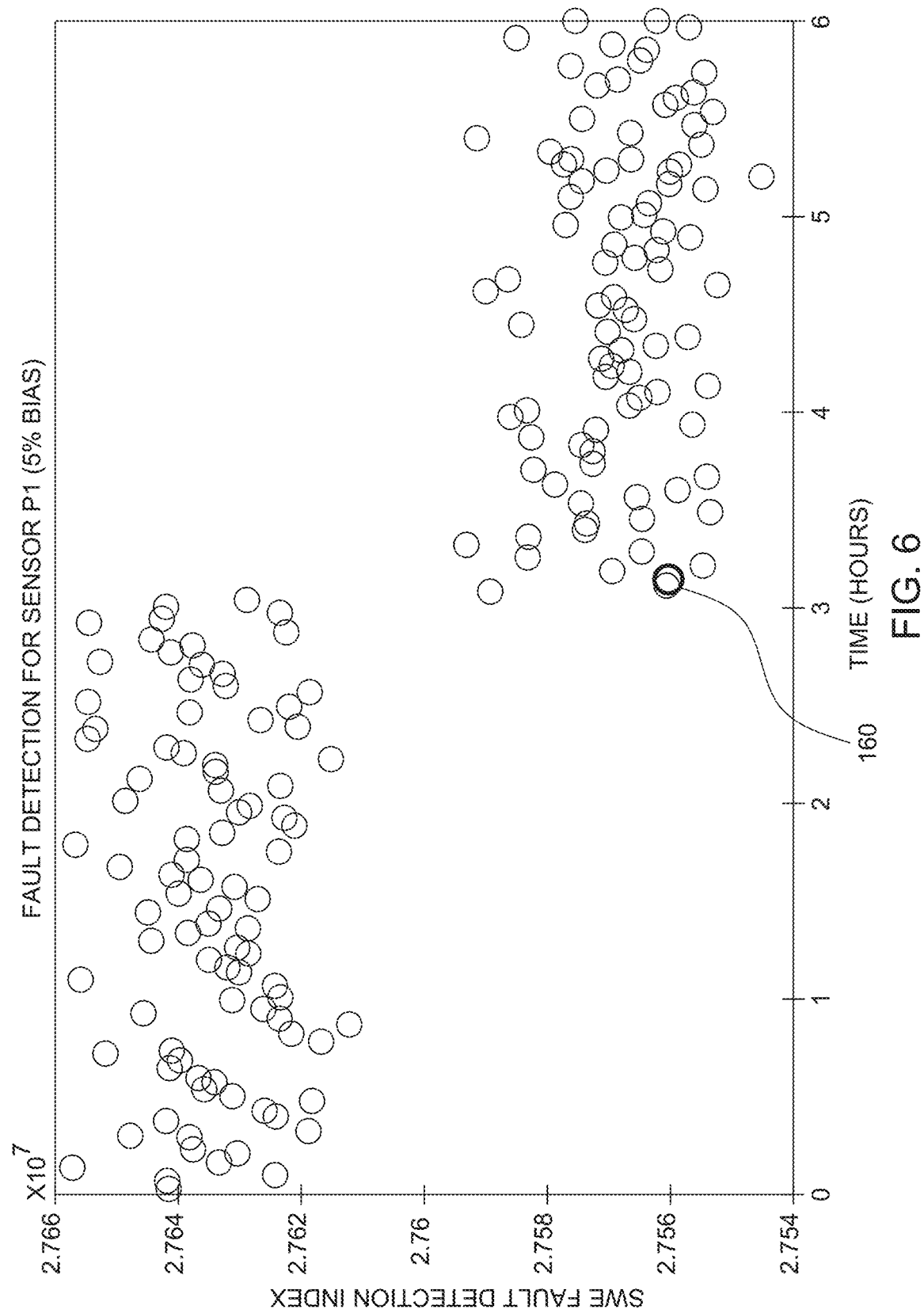
FIG. 6 depicts a fault detection index for a top side pressure sensor with a 5% bias applied as applied to test data, in accordance with aspects of the present disclosure.

The Weighted Squared Prediction Error metric was used to map, at each time instant, all 10 pressure sensor measurements to a single point. This mapping was initially done on the training data. The mean and standard deviation of the obtained points was calculated. When performing fault detection on the test data, the first time that three consecutive points were mapped outside two standard deviations of the training data mean value, a fault was deemed detected. Turning to FIG. 6, a fault detection index for sensor P1 (i.e., the top side node pressure sensor) is shown with a 5% bias applied to the test data. In this example, circle 160 indicates the time when a fault was detected for the sensor P1 with the 5% bias.

Once a fault was detected, the next step was to pinpoint the most probable sensor(s) that was (were) subjected to the fault(s). Two scenarios were considered in the analyses: (1) Scenario 1: one faulty sensor at a time; (2) Scenario 2: three simultaneous sensors (P1, P6 and P8) presenting faults at the same time.

Figure 7:
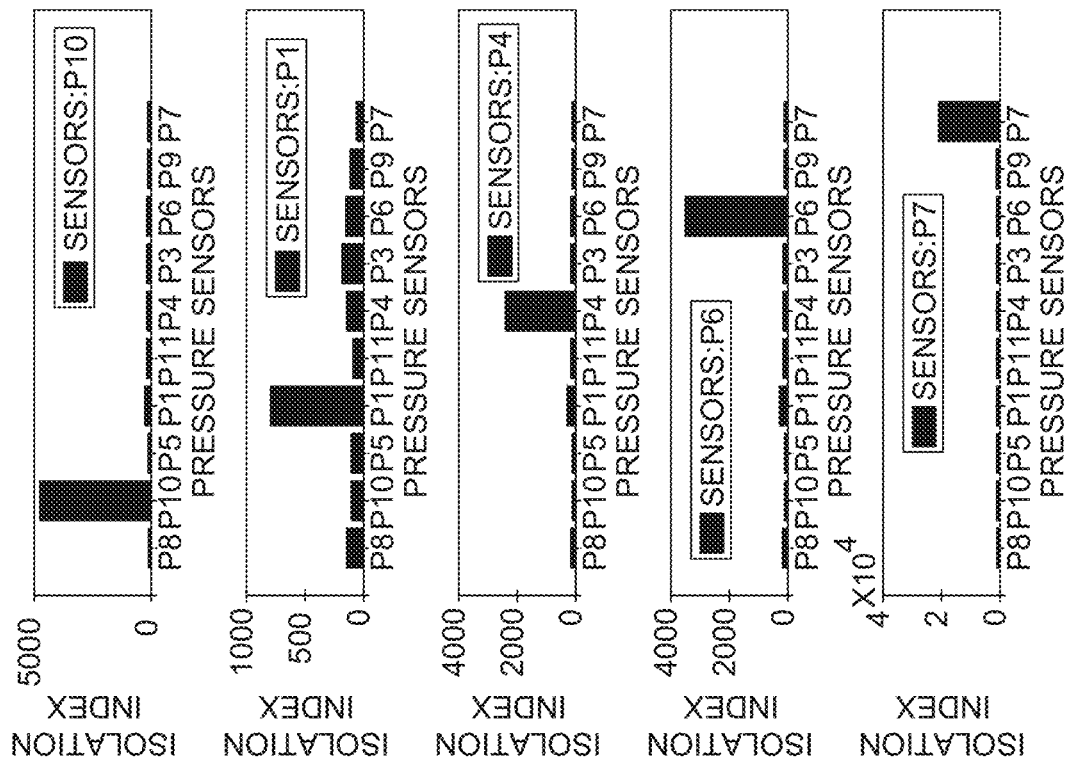
FIG. 7 depicts a fault isolation index in accordance with a first scenario with a 5% bias applied at individual respective sensors at different times, in accordance with aspects of the present disclosure.
Figure 7:
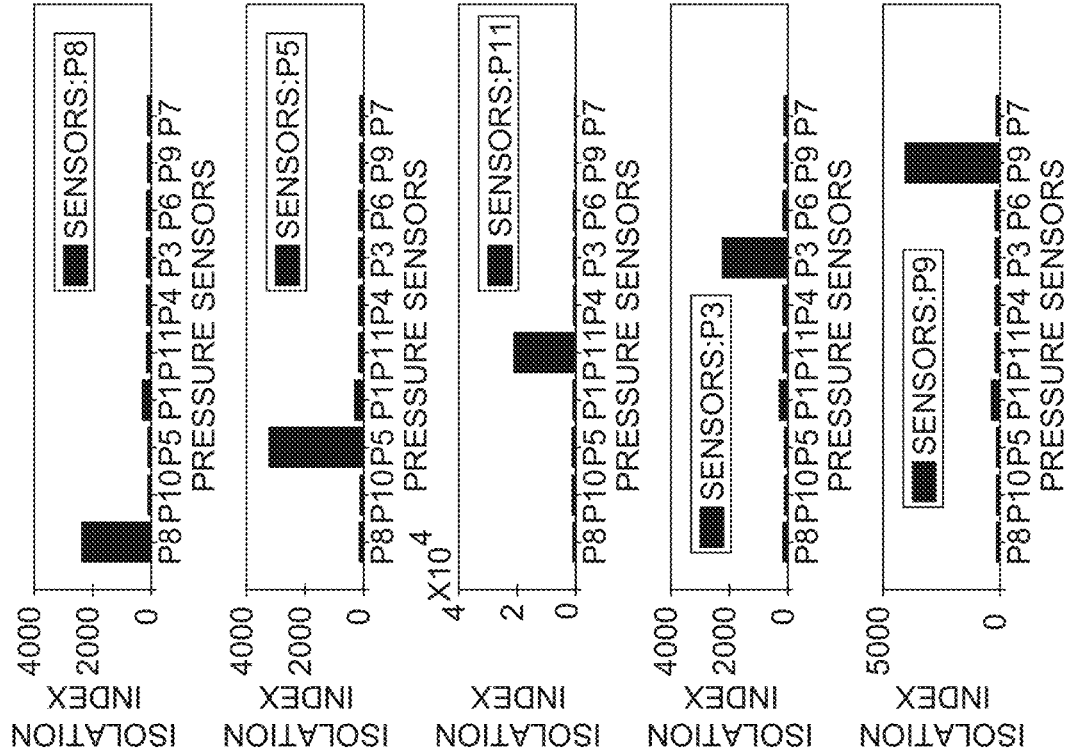
Figure 8:
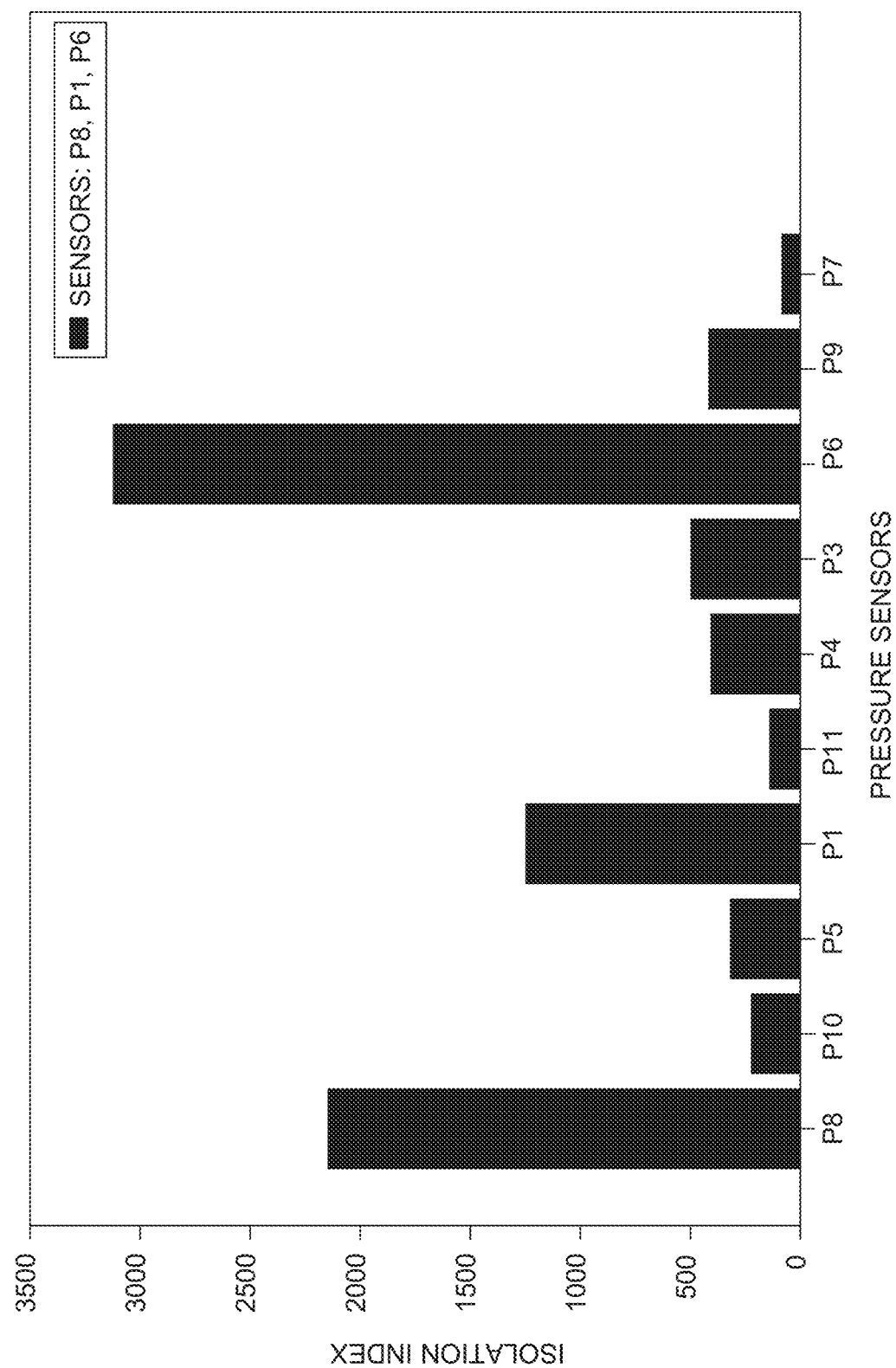
FIG. 8 depicts a fault isolation index in accordance with a second scenario with a 5% bias concurrently applied at three different sensors at the same time, in accordance with aspects of the present disclosure

In FIGS. 7 (scenario 1) and 8 (scenario 2), partial decomposition contribution plots were used to indicate which sensors were the most probable faulty sensor(s) for the scenarios 1 and 2, respectively. FIG. 7 depicts the fault isolation index of scenario 1 with a 5% bias at each sensor at different times. Conversely, FIG. 8 depicts the fault isolation index of scenario 2 with a 5% bias at sensors P1, P6, and P8 at the same time. After an analysis of the results it was possible to verify that all considered bias faults were properly isolated in the contribution plots.

Technical effects of the invention include use of a data-driven multivariate statistical method for the detection and isolation of sensor faults applied in a virtual flow metering context. In one implementation, the data-driven multivariate statistical method employs principal components analysis, weighted squared prediction error, and partial decomposition contribution plots.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A virtual flow meter, comprising:
   a processor-based controller configured to:
   acquire training measurements from a plurality of sensors over time, wherein the plurality of sensors are positioned in a flow path of a fluid and at least one of the plurality of sensors measures a flow of a multiphase production fluid;
   perform a principal components analysis of the training data to generate a principal components model defining a principal components component and a residual subspace;
   acquire current measurements from the plurality of sensors;
   define a number of operating points using the previously acquired training measurements of the plurality of sensors, project the current measurements of each operating point into the residual subspace to detect one or more outliers wherein the defined operation points are used as inputs, if present;

if one or more outliers are detected, apply partial decomposition to generate one or more contribution plots; and identify a faulty sensor based on the contribution plots.

2. The virtual flow meter of claim 1, wherein the controller comprises a processor based-controller.

3. The virtual flow meter of claim 1, wherein the controller comprises an application specific integrated circuit.

4. The virtual flow meter of claim 1, wherein the plurality of sensors comprise temperature sensors or pressure sensors.

5. The virtual flow meter of claim 1, wherein projecting the current measurements into residual space defines a residual vector.

6. The virtual flow meter of claim 1, wherein detecting one or more outliers comprises generating a weighted square prediction error metric that is assessed for deviations from expected measurements.

7. The virtual flow meter of claim 1, wherein detecting one or more outliers comprises computing a weighted square prediction error index for each measurement period.

8. The virtual flow meter of claim 1, comprising indicating detection of a sensor fault if one or more outliers are detected.

9. The virtual flow meter of claim 1, wherein the partial decomposition allocates the contribution of each sensor of the plurality of sensors to the one or more outliers.

10. The virtual flow meter of claim 1, wherein the number of operating points are defined through a receding horizon filtering, comparison with filtered values, and clustering based on measurements of specified variables.

11. A processor-based method for identifying faulty sensors in a fluid production network, comprising:

acquiring training measurements from a plurality of sensors over time, wherein the plurality of sensors are positioned in a flow path of a fluid and at least one of the plurality of sensors measures a flow of a multiphase production fluid;

performing a principal components analysis of the training data to generate a principal components model defining a principal components component and a residual subspace;

acquiring current measurements from the plurality of sensors;

defining a number of operating points using on the previously acquired training measurements of the plurality of sensors;

projecting the current measurements of each operating point into the residual subspace to detect one or more outliers wherein the defined operating points are used as inputs, if present;

if one or more outliers are detected, applying partial decomposition to generate one or more contribution plots; and identify a faulty sensor based on the contribution plots.

12. The method of claim 11, wherein the plurality of sensors comprise temperature sensors or pressure sensors.

13. The method of claim 11, wherein projecting the current measurements into residual space defines a residual vector.

14. The method of claim 11, comprising indicating detection of a sensor fault if one or more outliers are detected.

15. The method of claim 11, wherein the partial decomposition allocates the contribution of each sensor of the plurality of sensors to the one or more outliers.

16. One or more computer-readable media comprising executable routines, which when executed by a processor cause acts to be performed comprising:

acquiring training measurements from a plurality of sensors over time, wherein the plurality of sensors are positioned in a flow path of a fluid and at least one of the plurality of sensors measures a flow of a multiphase production fluid;

performing a principal components analysis of the training data to generate a principal components model defining a principal components component and a residual subspace;

acquiring current measurements from the plurality of sensors;

defining a number of operating points using the previously acquired training measurements of the plurality of sensors;

projecting the current measurements of each operating point into the residual subspace to detect one or more outliers wherein the operating points are used as inputs, if present;

if one or more outliers are detected, applying partial decomposition to generate one or more contribution plots; and identify a faulty sensor based on the contribution plots.

17. The one or more computer-readable media of claim 16, wherein projecting the current measurements into residual space defines a residual vector.

18. The one or more computer-readable media of claim 16, wherein the routines, when executed by the processor causes the act to be performed of indicating detection of a sensor fault if one or more outliers are detected.

19. The one or more computer-readable media of claim 16, wherein the partial decomposition allocates the contribution of each sensor of the plurality of sensors to the one or more outliers.

* * * * *